Nov. 23, 1926.

G. M. BETTS 1,607,863

COMBINATION RECEPTACLE

Filed Jan. 15, 1923

Inventor:
George M. Betts, by Alfred E. Baber,

His Attorney

Patented Nov. 23, 1926.

1,607,863

UNITED STATES PATENT OFFICE.

GEORGE M. BETTS, OF SCHENECTADY, NEW YORK, ASSIGNOR OF ONE-HALF TO HENRY E. BUTLER, OF SCHENECTADY, NEW YORK.

COMBINATION RECEPTACLE.

Application filed January 15, 1923. Serial No. 612,632.

The present invention relates to receptacles such as plates or dishes used for serving ice cream or the like and particularly to receptacles of low cost which are intended to be used but once and then thrown away. Such receptacles find use in ice cream parlors, at public functions and other places, and while the receptacles themselves are discarded, the spoons or other eating utensils are usually saved and used again. Now, in many instances such spoons or other eating utensils are poorly cleansed and seldom if ever properly sterilized with the result that they become spreaders of disease and a menace to public health.

The object of my invention is to provide an improved receptacle having attached to it an eating utensil which when removed from the receptacle may be utilized in eating the contents served in the receptacle, and for a consideration of what I believe to be novel and my invention attention is directed to the accompanying description and the claims appended thereto.

Figure 1:
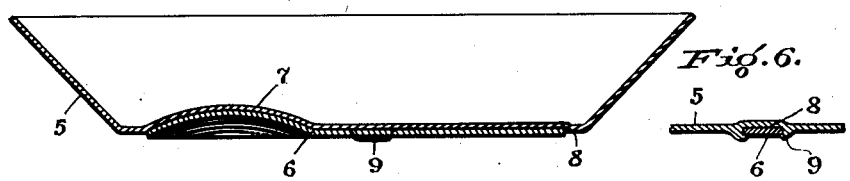
Figure 2:
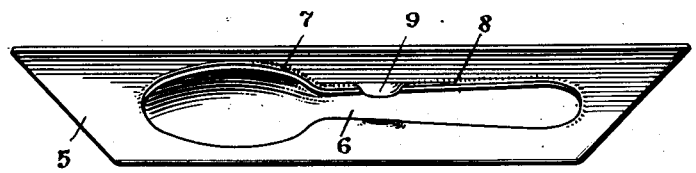
Figure 3:
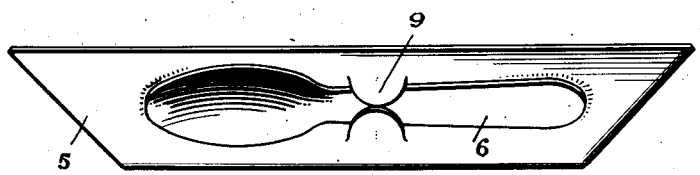
Figure 4:
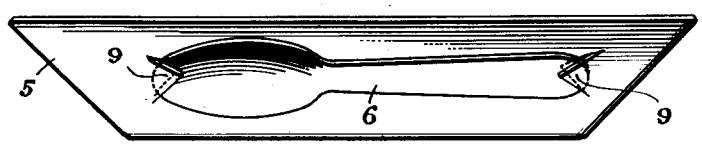
Figure 5:
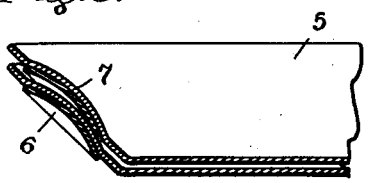

In the drawing, Fig. 1 is a sectional view of a receptacle embodying my invention; Figs. 2, 3 and 4 are side elevations of modifications; Fig. 5 is a sectional view showing how the receptacle of Figs. 2, 3 and 4 may be stacked and Fig. 6 is a sectional view illustrating the holding means of Figs. 1 and 2.

According to my invention I provide a receptacle made of suitable material such as celluloid, a hard fibre substance, metal, paper or the like and form in a wall of it an embossed or struck-out portion which receives an eating utensil. The utensil is held by the embossed portion by suitable means carried by the receptacle, by a wedging fit of the utensil and the embossed portion, or by both means jointly. The holding means is preferably a part formed integral with the receptacle, the arrangement being such that in removing the utensil from the receptacle, the latter will be somewhat mutilated or will carry signs of having been used. This is also of advantage from the standpoint of cost of manufacture. In addition to serving as a holding means for the utensil, the use of an embossed portion in the receptacle for receiving the utensil is of substantial advantage in that it permits the receptacles to be readily stacked one inside another for packing.

Referring to the drawing, 5 indicates a receptacle such as an ice cream dish and 6 an eating utensil such as a spoon. The receptacle is provided with an embossed portion 7 which receives the bowl of the spoon and an embossed portion 8 which partially or entirely receives the handle of the spoon, although this latter portion need not necessarily be provided. In Fig. 1 the embossed portion is shown as being in the bottom of the dish while in Figs. 2, 3 and 4 it is in a side wall thereof. The bowl of the spoon fits the embossed portion 7 with a suitable wedging fit which tends to retain it therein. In addition, holding means in the form of projections or ears 9 are provided which take hold of the handle of the spoon. These projections or ears 9 are an integral part of the material and are struck up from it. The holding means illustrated in Figs. 1 and 2 is shown in section in Fig. 6 and it will be seen that the projections or ears 9 are formed by pressing up a part of the material of the receptacle without making an opening entirely through it. This is of particular advantage when the spoon is fastened on the bottom of the dish. This arrangement is also of advantage in that the spoon is easily attached in this manner. In Figs. 3 and 4 the ears 9 are formed by making incisions through the wall of the dish, the spoon being put behind the ears in the manner shown in the drawing. In each instance I have shown the spoon as arranged on the outside of the dish but if desired it may be arranged inside as is obvious. Fig. 5 shows the way in which the dishes may be stacked one inside another for packing.

In use the substance to be served, such as ice cream, for example, is put into the receptacle and given to the patron. The patron then removes the spoon from the dish and uses it for eating the ice cream. The dish and spoon form in substance a unitary structure which is given to the patron and by this means the patron is insured of getting a dish and spoon which have not been used before. The removal of the spoon mutilates the dish more or less making it difficult and therefore extremely unlikely that a dish and spoon will be used a second time.

Structures embodying my invention may be manufactured at a low cost and when used have the advantage of doing away with all washing and sterilizing and of insuring to the patron a thoroughly clean and sanitary receptacle and eating utensil.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

An open top dish formed from non-metallic material, said dish being provided in one of its walls with an inward depression of a contour to receive an eating utensil, holding means at spaced points along the edge of said depression, said holding means being formed from the material of the dish at the edges of the depression and being adapted to hold an eating utensil in the depression.

In witness whereof, I have hereunto set my hand this 12th day of January, 1923.

GEORGE M. BETTS.